United States Patent
Han et al.

(10) Patent No.: US 9,599,044 B2
(45) Date of Patent: Mar. 21, 2017

(54) CONTROL APPARATUS FOR ENGINE HAVING TURBOCHARGER AND METHOD THEREOF

(71) Applicant: Hyundai Motor Company, Seoul (KR)

(72) Inventors: Dong Hee Han, Seoul (KR); Joowon Lee, Gwangju-si (KR); Hyun Jun Lim, Incheon (KR); Nahm Roh Joo, Yongin-si (KR); Yoon Joo Kim, Yongin-si (KR); Kiwon Park, Seoul (KR); Kwanhee Choi, Seoul (KR); Jong Il Park, Seoul (KR)

(73) Assignee: Hyundai Motor Company, Seoul (KR)

( * ) Notice: Subject to any disclaimer, the term of this patent is extended or adjusted under 35 U.S.C. 154(b) by 216 days.

(21) Appl. No.: 14/485,415

(22) Filed: Sep. 12, 2014

(65) Prior Publication Data

US 2015/0184603 A1 Jul. 2, 2015

(30) Foreign Application Priority Data

Dec. 26, 2013 (KR) .......................... 10-2013-0163788

(51) Int. Cl.
*F02D 23/00* (2006.01)
*F02D 41/00* (2006.01)
(Continued)

(52) U.S. Cl.
CPC .......... *F02D 41/0007* (2013.01); *F02B 37/18* (2013.01); *F02B 37/183* (2013.01);
(Continued)

(58) Field of Classification Search
CPC .......... F02D 41/0007; F02D 2041/001; F02D 11/10; F02B 37/183; F02B 37/18; Y02T 10/144
(Continued)

(56) References Cited

U.S. PATENT DOCUMENTS

| 2006/0201152 A1* | 9/2006 | Irisawa | F02D 13/0226 60/605.1 |
| 2013/0139786 A1* | 6/2013 | Glugla | F02D 41/0087 123/321 |
| 2013/0179050 A1* | 7/2013 | Munshi | F02B 43/10 701/104 |

FOREIGN PATENT DOCUMENTS

| JP | 3337799 (B2) | 8/2002 |
| JP | 2002-371919 (A) | 12/2002 |

(Continued)

*Primary Examiner* — Thomas Denion
*Assistant Examiner* — Thomas Olszewski
(74) *Attorney, Agent, or Firm* — Morgan, Lewis & Bockius LLP

(57) ABSTRACT

An control apparatus and method for an engine having a turbocharger may include determining a load condition of the engine by a controller, and opening and closing an intake valve, a throttle valve, and a wastegate valve by the controller according to the load condition of the engine, where a combustion chamber generates power by combusting a fuel, an intake valve adjusts an air/fuel mixed gas flowed into the combustion chamber, a continuously variable valve timing apparatus advances or retards an opening/closing timing of the intake valve, a turbocharger having a turbine and a compressor compressing air flowed into the combustion chamber, a throttle valve adjusting air supplied to the combustion chamber, a wastegate valve adjusting the exhaust gas flowed into the turbine, and a controller controlling the intake valve, the throttle valve, and the wastegate valve according to a load region of the engine.

2 Claims, 4 Drawing Sheets

(51) Int. Cl.
 *F02B 37/18* (2006.01)
 *F02D 11/10* (2006.01)
(52) U.S. Cl.
 CPC ........ *F02D 11/10* (2013.01); *F02D 2041/001* (2013.01); *Y02T 10/144* (2013.01)
(58) Field of Classification Search
 USPC .......................................................... 60/602
 See application file for complete search history.

(56) References Cited

FOREIGN PATENT DOCUMENTS

| | | |
|---|---|---|
| JP | 2006-138324 A | 6/2006 |
| JP | 2012-7545 A | 1/2012 |
| KR | 1994-0001322 B1 | 2/1994 |
| KR | 10-0558913 (B1) | 3/2006 |
| KR | 10-2007-0090244 A | 9/2007 |

* cited by examiner

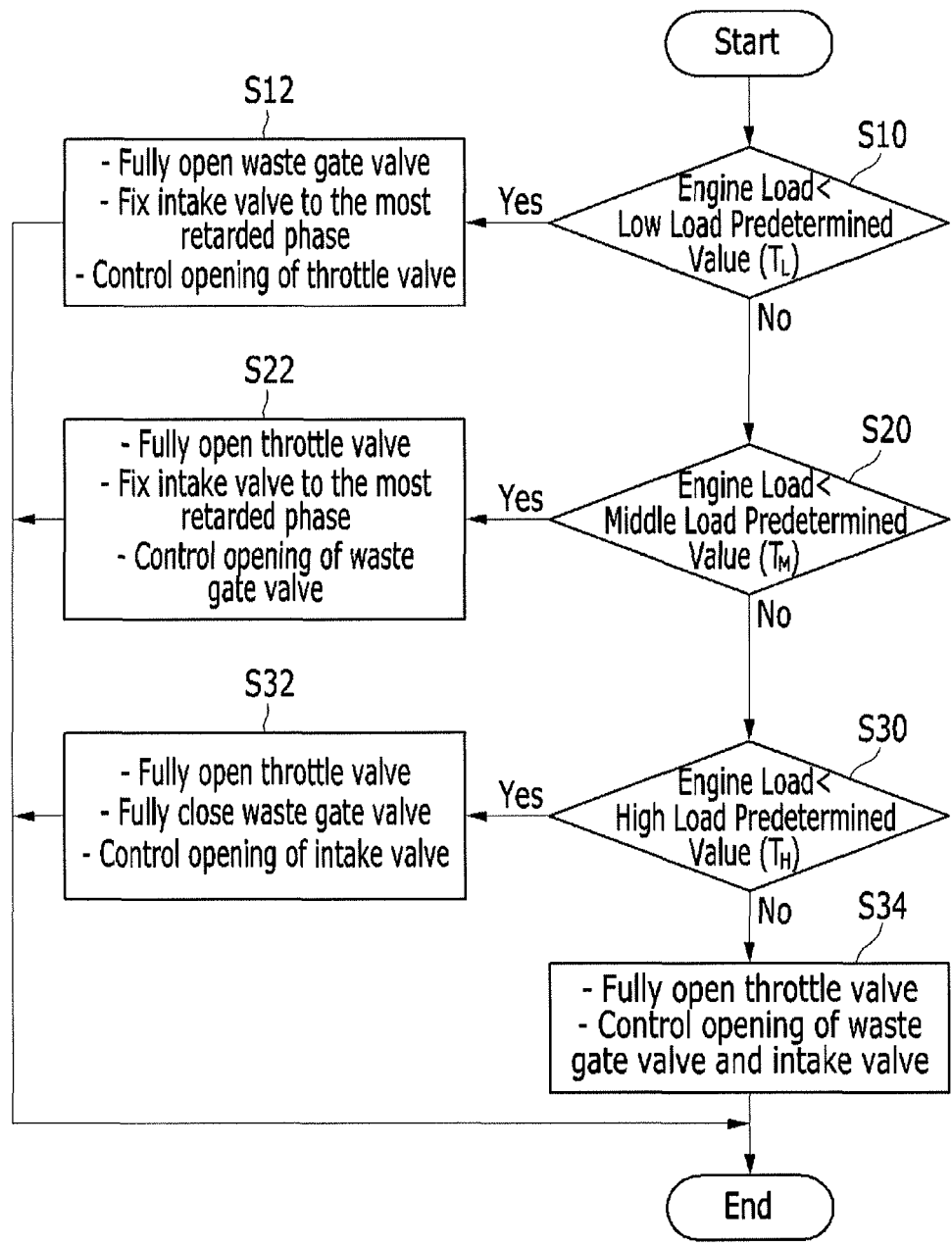

CONTROL APPARATUS FOR ENGINE HAVING TURBOCHARGER AND METHOD THEREOF

CROSS-REFERENCE TO RELATED APPLICATION

The present application claims priority to Korean Patent Application No. 10-2013-0163788 filed Dec. 26, 2013, the entire contents of which is incorporated herein for all purposes by this reference.

BACKGROUND OF THE INVENTION

Field of the Invention

The present invention relates to an engine control apparatus for an engine having a turbocharger and a method thereof. More particularly, the present invention relates to a control apparatus for an engine having a turbocharger and a method to reduce fuel consumption by optimized control according to a load condition of an engine.

Description of Related Art

Generally, an engine of a vehicle generates power by combusting a mixture of a fuel and air supplied from the outside.

In the process of generating power by driving the engine, sufficient air must be supplied to the engine in order to obtain a desired output and combustion efficiency. To increase combustion efficiency and enhance output of the engine, a supercharger or a turbocharger that pressurizes air and supplies the pressurized air to the engine is applied to the vehicle.

The turbocharger is a device that rotates a turbine by using pressure of exhaust gas discharged from the engine, and thereafter increases output of the engine by supplying high pressure air to a combustion chamber by using rotational force thereof. The turbocharger has been applied to a diesel engine, and recently to a gasoline engine.

In order to efficiently operate the engine having the turbocharger, it is necessary to differently operate the engine according to a load condition of the engine.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a control apparatus for an engine having a turbocharger and a method that suppresses knocking in a middle load condition and a high load condition, and maximizes combustion efficiency.

In an aspect of the present invention, a control apparatus for an engine having a turbocharger may include an intake valve adjusting an air/fuel mixed gas flowed into the combustion chamber, a continuously variable valve timing apparatus advancing or retarding opening/closing timing of the intake valve, a turbocharger including a turbine operated by exhaust gas generated from the combustion chamber, and a compressor operated in conjunction with the turbine and compressing air flowed into the combustion chamber, a throttle valve adjusting air supplied to the combustion chamber, a wastegate valve adjusting the exhaust gas flowed into the turbine, and a controller controlling the intake valve, the throttle valve, and the wastegate valve according to a load region of an engine.

The controller may control the wastegate valve to be fully opened, the intake valve to be fixed to the most retarded phase, and an opening of the throttle valve under a low load condition of the engine.

The controller may control the throttle valve to be fully opened, the intake valve to be fixed at a most delayed state, and an opening of the wastegate valve under a middle load condition of the engine.

The controller may control the throttle valve to be fully opened, the wastegate valve to be fully closed, and an opening of the intake valve under a high load condition of the engine.

The controller may control the throttle valve to be fully opened, an opening of the wastegate valve, and an opening of the intake valve by using the variable valve timing apparatus under a maximum load condition of the engine.

In another aspect of the present invention, an engine control method of an engine having a turbocharger may include determining a load condition of the engine by a controller, and opening and closing an intake valve, a throttle valve, and a wastegate valve by the controller according to the load condition of the engine, where a combustion chamber generates power by combusting a fuel, an intake valve adjusts an air/fuel mixed gas flowing into the combustion chamber, a continuously variable valve timing apparatus advances or retards opening and closing timing of the intake valve, a turbocharger includes a turbine operated by exhaust gas generated from the combustion chamber and a compressor operated in conjunction with the turbine and compressing air flowed into the combustion chamber, a throttle valve adjusts air supplied to the combustion chamber, a waste gate valve adjusts the exhaust gas flowed into the turbine, and a controller controls the intake valve, the throttle valve, and the waste gate valve according to a load region of the engine.

The engine control method of an engine having a turbocharger may further include controlling the wastegate valve to be fully opened, the intake valve to be fixed to the most retarded phase, and an opening of the throttle valve by the controller, when the load condition of the engine is determined as a low load condition.

The engine control method of an engine having a turbocharger may further include controlling the throttle valve to be fully opened, the intake valve to be fixed at a most delayed state, and an opening of the wastegate valve by the controller when the load condition of the engine is determined as a middle load condition.

The engine control method of an engine having a turbocharger may further include controlling the throttle valve to be fully opened, the wastegate valve to be fully closed, and an opening of the intake valve by the controller when the load condition of the engine is determined as a high load condition.

The engine control method of an engine having a turbocharger may further include controlling the throttle valve to be fully opened, an opening of the wastegate valve, and an opening of the intake valve by using the variable valve timing apparatus when the load condition of the engine is determined as a maximum load condition.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention

BRIEF DESCRIPTION OF THE DRAWINGS

FIG. 4 is a flowchart illustrating a control method of an engine having a turbocharger according to an exemplary embodiment of the present invention.

Figure 1:
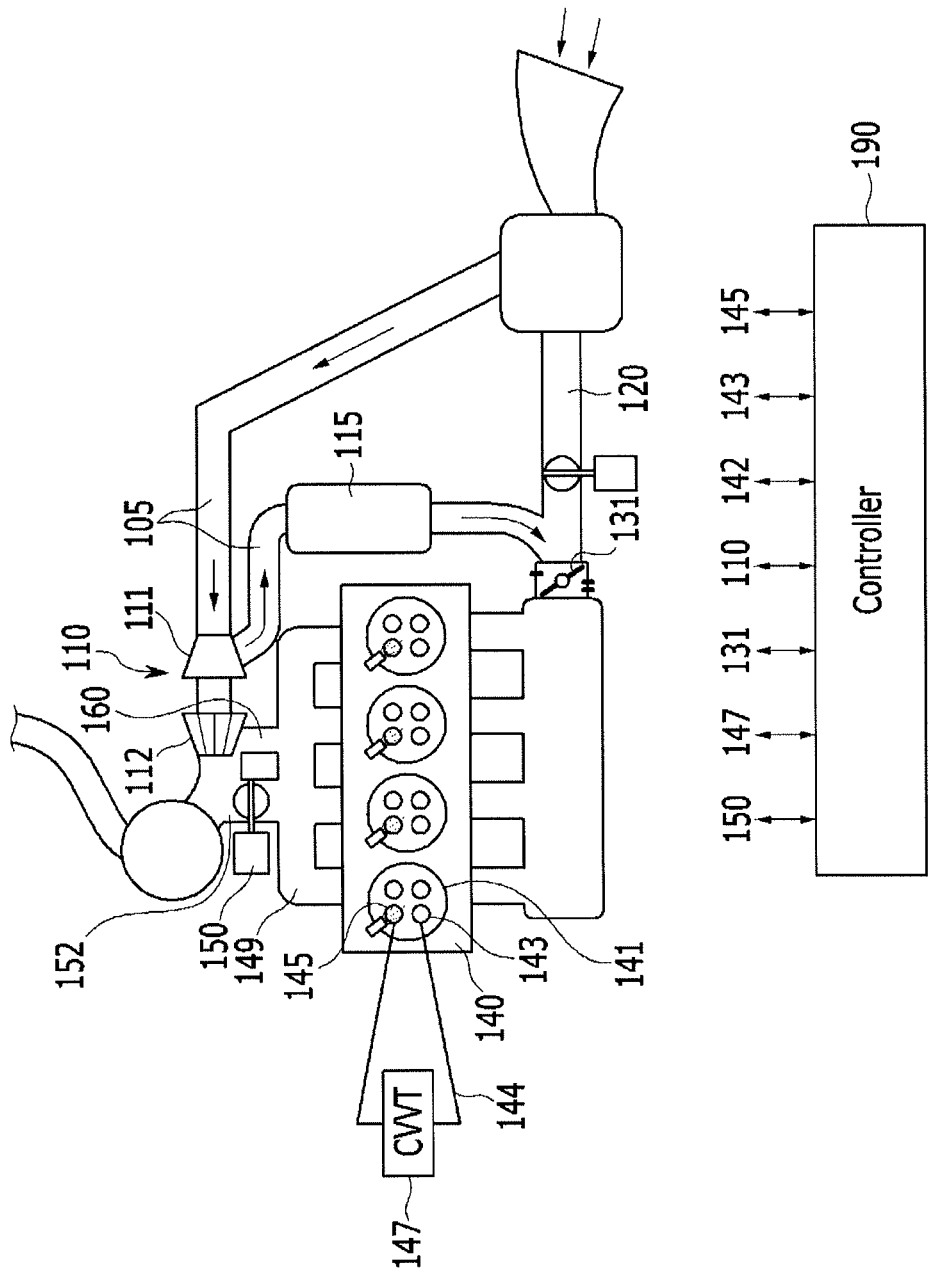
FIG. 1 is a block diagram illustrating an engine system having a turbocharger according to an exemplary embodiment of the present invention.

Reference numerals set forth in the Drawings include reference to the following elements as further discussed below:

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, an exemplary embodiment of the present invention will be described with reference to the accompanying drawings so that those skilled in the Field of the Invention to which the present invention pertains may carry out the exemplary embodiment.

In describing the present invention, parts that are not related to the description will be omitted. Like reference numerals generally designate like elements throughout the specification.

In addition, the size and thickness of each configuration shown in the drawings are arbitrarily shown for better understanding and ease of description, but the present invention is not limited thereto. In the drawings, the thickness of layers, films, panels, regions, etc., are exaggerated for clarity.

FIG. 1 is a block diagram illustrating an engine system having a turbocharger according to an exemplary embodiment of the present invention.

As shown in FIG. 1, an engine system according to an exemplary embodiment of the present invention may include a combustion chamber 141 generating power by combusting a fuel, an intake valve 143 adjusting an air/fuel mixed gas flowed into the combustion chamber 141, a continuously variable valve timing apparatus 147 advancing or retarding opening and closing timing of the intake valve 143 through a camshaft 144, a turbocharger 110 including a turbine 112 operated by exhaust gas generated from the combustion chamber 141 and a compressor 111 compressing air to be flowed into the combustion chamber 141 in conjunction with the turbine 112, a throttle valve 131 adjusting air supplied to the combustion chamber 141, a wastegate valve 150 bypassing the exhaust gas flowed into the turbine 112 to an outlet of the turbine 112, and a controller 190 controlling the intake valve 143, the throttle valve 131, and the wastegate valve 150 according to a load region of an engine.

The continuously variable valve timing apparatus (CVVT) 147 is an apparatus that adjusts opening timing and closing timing of the intake valve 143 and an exhaust valve 145. The opening timing and the closing timing of the intake valve 143 and the exhaust valve 145 are operated by a rotation of the camshaft 144, and the continuously variable valve timing apparatus 147 advances or retards the opening timing and the closing timing through the controller 190.

In the continuously variable valve timing apparatus 147, by strategic use of late intake valve closing (LIVC), a pumping loss is reduced and thermal efficiency is increased by an increment of a compression ratio.

The turbocharger 110 includes the turbine 112 rotating by exhaust gas discharged from the engine, and the compressor 111 connected to the turbine 112 by a rotating shaft and rotating with rotation of the turbine 112. The turbocharger 110 compresses external air by rotation of the compressor 111, and supplies the compressed air to the combustion chamber 141 such that combustion efficiency of the engine is improved.

The air compressed by the turbocharger 110 is cooled by an intercooler 115 provided in an intake line 105 and supplied to the combustion chamber 141 of the engine through the throttle valve 131.

In an exemplary embodiment of the present invention, air may be supplied to the intake manifold through a second intake line 120.

The exhaust gas discharged from the combustion chamber 141 is discharged to an exhaust line 160 formed in an exhaust manifold 149. A bypass line 152 is branched from the exhaust manifold 149 and joined to the exhaust line 160. A part of the exhaust gas is detoured through the bypass line 152. When a boost pressure of the compressor 111 is higher than a predetermined pressure, output of the turbine 112 is adjusted by detouring the exhaust gas flowed into the turbine 112 through the bypass line 152. An amount of the detouring exhaust gas is adjusted by the wastegate valve 150 provided in the bypass line 152.

The controller 190 executes a set of instructions for controlling opening/closing of the intake valve 143, the throttle valve 131, and the wastegate valve 150 according to a load condition of the engine.

Figure 2:
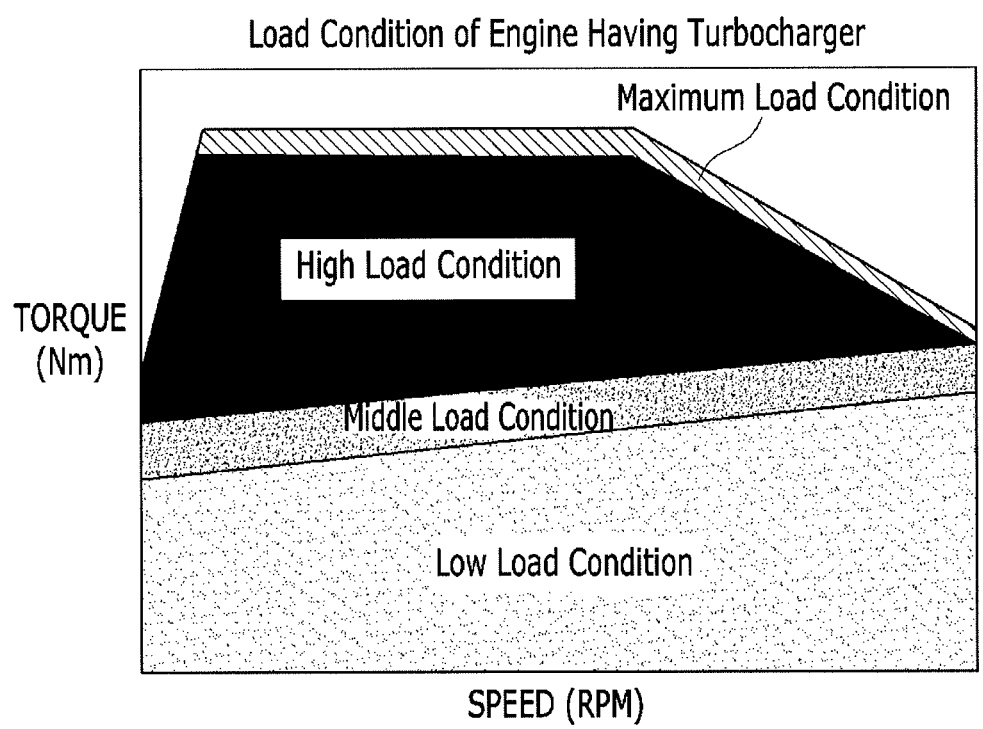
FIG. 2 is a graph illustrating a relationship between Revolutions Per Minute (RPM) and torque of an engine having a turbocharger according to an exemplary embodiment of the present invention.
Figure 3:
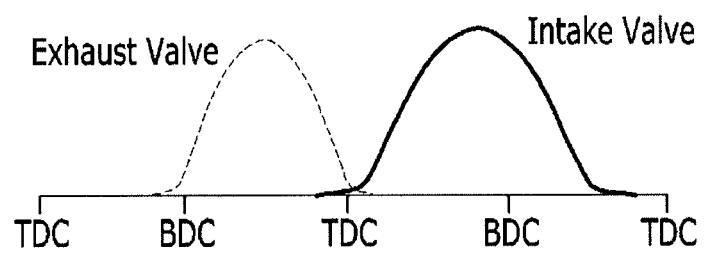
FIG. 3 is a graph illustrating a phase of a camshaft of a continuously variable valve timing apparatus.
Figure 3:
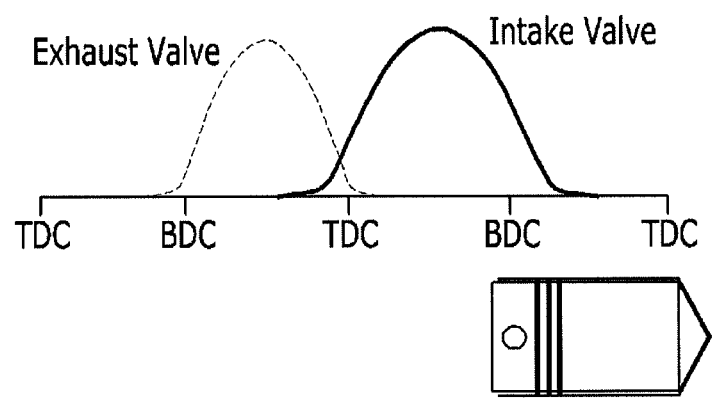
Figure 3:
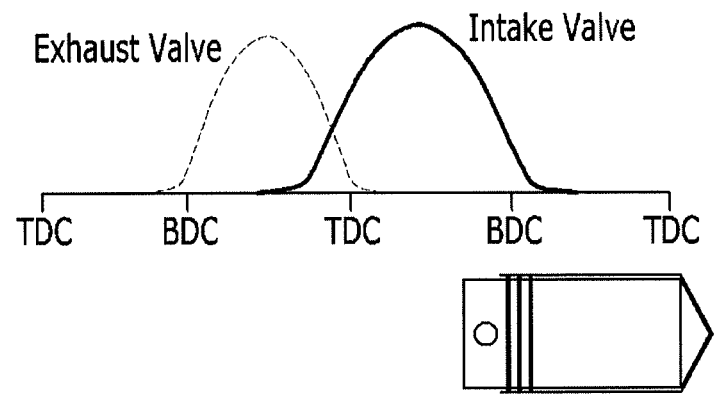

As shown in FIG. 2, the load condition of the engine is divided into a low load condition, a middle load condition, a high load condition, and a maximum load condition. The controller 190 controls one of the intake valves 143, the throttle valve 131, and the wastegate valve 150, and the other two valves are controlled to maximize combustion efficiency such as prevention of pumping loss and knocking according to the load condition.

The controller 190 may be an ECU (engine control unit) controlling various electronic devices of a vehicle. The controller 190 may be implemented with one or more microprocessors operated by a predetermined program or hardware including the microprocessor, and the predetermined program includes a series of commands for performing a control method of an engine having a turbocharger according to an exemplary embodiment of the present invention to be described below.

When the load condition of the engine is the low load condition, the controller 190 controls the wastegate valve 150 to be fully opened, the intake valve 143 to be fixed to the most retarded phase, and the opening of the throttle valve 131.

That is, the intake valve 143 is fixed to the most retarded phase and the wastegate valve 150 is fully opened when the load condition is the low load condition such that pumping loss is minimized by late intake valve closing. Further, the controller 190 controls the opening of the throttle valve 131 such that a load of the engine is controlled.

When the load condition of the engine is the middle load condition, the controller 190 controls the throttle valve 131 to be fully opened, the intake valve 143 to be fixed at the most retarded phase, and the opening of the wastegate valve 150.

That is, in the middle load condition, since that prevention of knocking is advantageous to fuel efficiency by minimizing a real compression ratio, the throttle valve 131 is fully opened and the intake valve 143 is fixed to the most retarded phase. The controller 190 controls the opening of the wastegate valve 150 such that the load of the engine is controlled.

When the load condition of the engine is the high load condition, the controller 190 controls the throttle valve 131 to be fully opened, the wastegate valve 150 to be fully closed, and the opening of the intake valve 143.

That is, in the high load condition, air flowed into the combustion chamber 141 of the engine is maximized by fully opening the throttle valve 131 and fully closing the wastegate valve 150, such that boost pressure generated at the turbocharger 110 is maximized. The controller 190 controls the opening of the intake valve 143 by using the continuously variable valve timing apparatus such that the load of the engine is controlled.

When the load condition of the engine is the maximum load condition, the controller 190 controls the throttle valve 131 to be fully opened, the opening of the wastegate valve 150, and the opening of the intake valve 143 by using the continuously variable valve timing apparatus 147.

Here, the maximum load condition of the engine device a load condition in which maximum torque can be outputted by opening the throttle valve.

When the load condition of the engine is the maximum load condition and a speed condition of a vehicle is a low/middle speed condition, the controller 190 controls the closing timing of the intake valve 143, thereby low speed torque is obtained. Accordingly, scavenging of the combustion chamber 141 is efficiently performed, and combustion stability can be obtained. The controller 190 controls the opening of the wastegate valve 150 such that the load of the engine is controlled. Further, when knocking (preignition) occurs in the combustion chamber 141, the controller 190 controls the opening timing of the intake valve 143 by using the continuously variable valve timing apparatus 147. Accordingly, compression ratio of mixed gas is reduced, and the knocking (preignition) can be suppressed.

When the load condition of the engine is the maximum load condition and the speed condition of the vehicle is a high speed condition, the controller 190 controls the closing timing of the intake valve 143 by using the continuously variable valve timing apparatus 147, thereby an excessive increment of back pressure of exhaust gas can be prevented. The controller 190 controls the opening/closing of the wastegate valve 150 such that the load of the engine is controlled.

Hereinafter, a control method of an engine having a turbocharger according to an exemplary embodiment of the present invention will now be described in detail with reference to FIG. 4.

FIG. 4 is a flowchart illustrating a control method of an engine having a turbocharger according to an exemplary embodiment of the present invention.

As shown in FIG. 4, the controller 190 determines the load condition of the engine.

The controller determines whether the load of the engine is less than a low load predetermined value ($T_L$) at step S10.

When the load of the engine is less than the low load predetermined value ($T_L$), the controller 190 controls the wastegate valve 150 to be fully opened and the intake valve 143 to be fixed to the most retarded phase. And the controller 190 controls the opening of the throttle valve 131 such that the load of the engine is controlled at step S12.

The controller determines whether the load of the engine is less than a middle load predetermined value ($T_M$) at step S20.

When the load of the engine is less than the middle load predetermined value ($T_M$), the throttle valve 131 is controlled to be fully opened and the intake valve 143 is controlled to be fixed at the most retarded phase. The controller 190 controls the opening of the wastegate valve 150 such that the load of the engine is controlled at step S22.

The controller 190 determines whether the load of the engine is less than a high load predetermined value ($T_H$) at step S30.

When the load of the engine is less than the high load predetermined value ($T_H$), the controller 190 controls the throttle valve 131 to be fully opened and the wastegate valve 150 to be fully closed. The controller 190 controls the opening of the intake valve 143 by using the continuously variable valve timing apparatus such that the load of the engine is controlled at step S32.

When the load of the engine is greater than the high load predetermined value ($T_H$), the controller 190 controls the throttle valve 131 to be fully opened, controls the opening of the wastegate valve 150, and controls the opening of the intake valve 143 by using the continuously variable valve timing apparatus such that the load of the engine is controlled at step S34.

As described above, the control apparatus for an engine having a turbocharger according to an exemplary embodiment of the present invention uses major control factors among the throttle valve 131, the intake valve 143, and the wastegate valve 150 according to the load condition of the engine. Therefore, a pumping loss can be minimized under the low load condition, combustion efficiency can be increased under the middle/high load condition, a control margin can be assured, and abnormal combustion such as knocking (preignition) can be prevented under the maximum load condition.

According to an exemplary embodiment of the present invention, it is possible to maximize combustion efficiency by using one of a throttle valve, a wastegate valve, and a continuously variable valve timing apparatus as a major control factor according to a load condition of an engine.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A control apparatus for an engine having a turbocharger, comprising:
    a combustion chamber generating power by combusting a fuel;
    an intake valve adjusting an air/fuel mixed gas flowed into the combustion chamber;
    a continuously variable valve timing apparatus advancing or retarding an opening/closing timing of the intake valve;
    the turbocharger comprising:
        a turbine operated by exhaust gas generated from the combustion chamber; and
        a compressor operated in conjunction with the turbine and compressing air flowed into the combustion chamber;
    a throttle valve adjusting air supplied to the combustion chamber;
    a wastegate valve adjusting the exhaust gas flowed into the turbine; and
    a controller controlling the intake valve, the throttle valve, and the wastegate valve according to a load region of the engine,
    wherein the controller controls the wastegate valve to be fully opened, the intake valve to be fixed to a most retarded phase, and an opening of the throttle valve under a first load condition of the engine,
    wherein the controller controls the throttle valve to be fully opened, the intake valve to be fixed at a most delayed state, and an opening of the wastegate valve under a second load condition of the engine, the second load condition being higher than the first load condition,
    wherein the controller controls the throttle valve to be fully opened, the wastegate valve to be fully closed, and an opening of the intake valve under a third load condition of the engine which is higher than the second load condition, and
    wherein the controller controls the throttle valve to be fully opened, an opening of the wastegate valve, and an opening of the intake valve by using the variable valve timing apparatus under a maximum load condition of the engine which is higher than the third load condition.

2. A control method of a control apparatus for an engine having a turbocharger, comprising:
    determining a load condition of the engine by a controller;
    opening and closing an intake valve, a throttle valve, and a wastegate valve by the controller according to the load condition of the engine,
    wherein the control apparatus includes:
        a combustion chamber generating power by combusting a fuel;
        the intake valve adjusting an air/fuel mixed gas flowed into the combustion chamber;
        a continuously variable valve timing apparatus advancing or retarding opening and closing timing of the intake valve;
        the turbocharger including:
            a turbine operated by exhaust gas generated from the combustion chamber; and
            a compressor operated in conjunction with the turbine and compressing air flowed into the combustion chamber;
        the throttle valve adjusting air supplied to the combustion chamber;
        the wastegate valve adjusting exhaust gas flow into the turbine; and
        the controller,
    controlling the wastegate valve to be fully opened, the intake valve to be fixed to a most retarded phase, and an opening of the throttle valve by the controller, when the load condition of the engine is determined as a first load condition;
    controlling the throttle valve to be fully opened, the intake valve to be fixed at a most delayed state, and an opening of the wastegate valve by the controller when the load condition of the engine is determined as a second load condition which is higher than the first load condition;
    controlling the throttle valve to be fully opened, the wastegate valve to be fully closed, and an opening of the intake valve when the load condition of the engine is determined as a third load condition which is higher than the second load condition; and
    controlling the throttle valve to be fully opened, an opening of the wastegate valve, and an opening of the intake valve by using the variable valve timing apparatus by the controller when the load condition of the engine is determined as a maximum load condition which is higher than the third load condition.

* * * * *